Jan. 2, 1934.   E. C. HORTON ET AL   1,942,359
WINDSHIELD HEATER
Filed Nov. 13, 1929
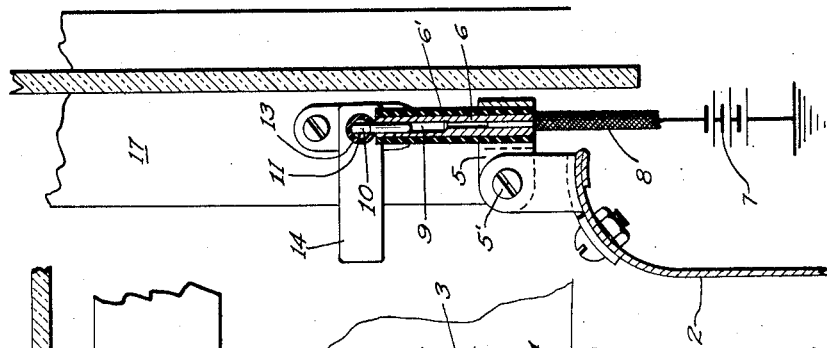
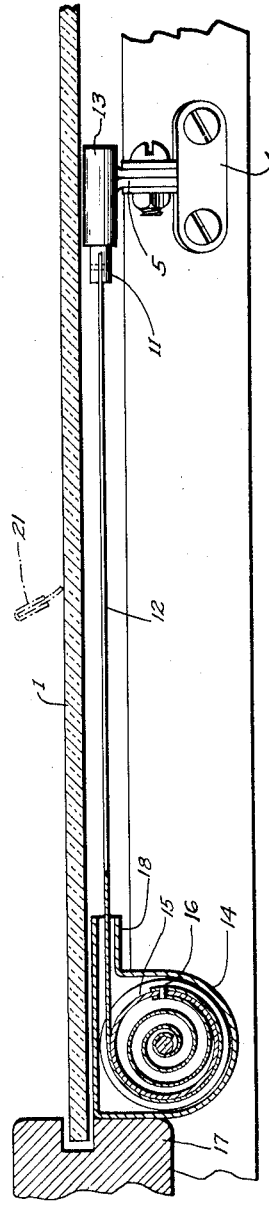
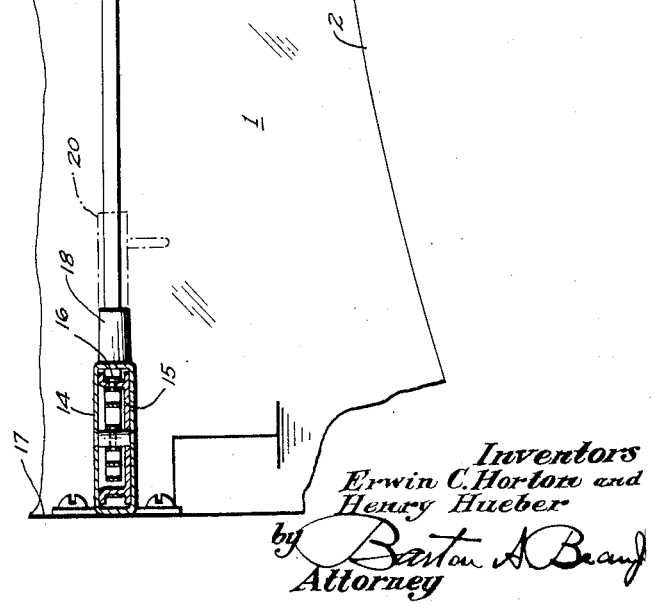
Inventors
Erwin C. Horton and
Henry Hueber
by Barton A. Beau
Attorney Patented Jan. 2, 1934

1,942,359

UNITED STATES PATENT OFFICE 1,942,359

WINDSHIELD HEATER

Erwin C. Horton, Hamburg, and Henry Hueber, Buffalo, N. Y., assignors to Trico Products Corporation, Buffalo, N. Y.

Application November 13, 1929
Serial No. 406,827

10 Claims. (Cl. 219—19)

This invention relates to an apparatus for preventing or removing the beclouding of windshields through the congealing and freezing of moisture thereon, and provides for the maintenance of a clear vision through the windshield. Particularly the invention relates to an electric heater for mounting adjacent the windshield to warm the same against the freezing of moisture thereon.

Electric windshield heaters have heretofore been devised comprising a supporting body for a resistance element, the dimensions and construction of the heaters being such as to restrict and partially obstruct the driver's vision through the windshield. Not only have the heaters been cumbersome and of vision-obstructing dimensions when in use, but when not in use their mountings have prevented proper concealment and disposal of the heater from the vision of the driver.

The present invention aims to provide a windshield heater to overcome these disadvantages; and also a heater of a normally small compass adapted to be extended to an operative position for efficiently heating a relatively large expanse of the windshield glass, whereby a field or zone of vision of ample size may be readily obtained in cooperation with a windshield cleaner.

The invention further resides in a novel mounting means for the heating element wherein the supporting members thereof comprise the open ends of an electric circuit and the element in being mounted therebetween acts to complete the circuit.

The invention also resides in the provision of a windshield heater having a resistance element designed for being retracted to an inoperative position within its housing or casing and adapted for being withdrawn therefrom and engaged with an anchoring member in a position adjacent a windshield for heating the same; and also in the provision of means for connecting the resistance element into the electric circuit by and during the act of engaging the same with its anchor.

The invention will further be found to reside in the salient features of construction, in the mounting and combination of parts and their arrangements hereinafter described, whereby the heater will normally be disposed in an inconspicuous place adjacent the windshield, and will be operatively disposed in a position to obstruct a relatively inconsequential portion of the driver's vision.

In the drawing:

Fig. 1 is a fragmentary showing of the windshield equipped with a heater embodying the present invention, portions of the heater being in section.

Fig. 2 is a plan view, partly in section, of the heater in its operative position, as depicted in Fig. 1.

Fig. 3 is a fragmentary vertical section showing more clearly the anchor member construction and its mounting.

Proceeding in accordance with the present invention, the resistance element is automatically retractible to an inoperative position within its casing when its free end is disengaged from its anchor. Preferably this automatic retraction is effected by a spring means, and for the purposes of illustration this spring means has been shown in the embodiment of a spring drum or wheel about which the resistance element is wound as it is retracted within its casing. Upon withdrawal of the resistance element from its casing to a predetermined extent, the free end portion thereof is engaged with the anchor so that the resistance element is held extended under the tension of the spring retracting means. Preferably this engagement of the free end of the resistance element with its anchor automatically connects said element in circuit with a source of electrical energy, so that the element will immediately begin functioning to warm the windshield glass.

Referring more particularly to the drawing, the numeral 1 designates the windshield glass and 2 a lower frame bar thereof. This frame bar is utilized as a means of support for the anchor member which is generally indicated by the numeral 3. In the illustration, the anchor member is secured to the frame member 2 by means of a base bracket 4, on which is pivotally secured a bracket arm 5. This arm may be shaped so as to securely embrace and hold a post 6 therein and is insulated therefrom by an enveloping sheathing 6' of insulating material. The post is connectible to the source of electrical energy 7 by a circuit wire 8 which may be conveniently connected to the lower end of the post. The upper end of the post is provided with a socket 9 for pivotally receiving a terminal pin 10, which projects laterally from the head or free outer end 11 of the resistance unit 12, the head being enclosed with an insulating sleeve 13.

Mounted on the windshield frame, or some other suitable support, and at a distance from the anchor 3 is a housing or casing 14 enclosing a spring drum or support 15 to which the inner end of a heating member, herein depicted as a resistance element 12, is attached, as indicated at 16. The casing, in the present showing, has been attached to the left hand upright 17 of the windshield, and may be disposed so that the drum or windlass 15 rotates about a vertical axis. The casing is provided with a neck 18 extending adjacent the inner face of the windshield glass 1, substantially tangential to the drum 15, through which the resistance element passes, and is of a size to receive the inner end of the head 11, when the latter is disengaged from its anchor. The retraction of the element 12 by the spring drum is limited by a shoulder 19 on the head 11, which engages the outer end of the throat 18 to close the same. When the resistance element is operatively disposed it extends substantially parallel to the windshield glass in proximity thereto. The heating function of this element may be varied by adjusting the anchor member about the bracket pivot 5' to alter the space or distance between the glass and the element, the pin 10 pivoting to accommodate such adjustment.

This arrangement defines a preferred application of the heating device. It will be understood however that the same may be similarly applied to any of the numerous windows of a vehicle.

In use, the resistance element in its inoperative position is fully housed within the casing 14 and the head 11 is held over the throat 18, as indicated by the dotted showing 20. When the operator desires to use the device the head 11 is grasped and the resistance element is withdrawn against the tension of the unwinding drum, following which the contact pin 10 is inserted within the socket 9 of the previously adjusted post 6. This not only closes the circuit but also extends the resistance element to a position for heating that area of the windshield glass which is traversed by the wiper 21. When it is desired to discontinue the use of the heater the head is lifted to disengage the pin 10 from its socket whereupon the spring drum will retract the element within the casing 14.

What is claimed is:

1. A heater for windshields comprising a windlass mounted adjacent a windshield and an anchor member mounted adjacent thereto and spaced from said windlass, said windlass and said anchor member comprising the open ends of an electrical circuit, and a flexible resistance element extended between said windlass and said member to complete the circuit.

2. An electric heater for windshields comprising a spring drum mounted adjacent said windshield, an anchor member adjacent said windshield and spaced from said drum, said drum and anchor member being respectively connected to opposite poles of an electric circuit, a flexible resistance element carried by said drum, said element being adapted for unwinding from said drum and being provided at the free end with means for electrical and mechanical connection with the anchor member, whereby said resistance element is heated only when in the extended or anchored position.

3. An electric heater for windshields comprising a spring drum mounted adjacent the lower portion of said windshield, an anchor member mounted adjacent said windshield and spaced from said drum, said drum and anchor member being respectively connected to opposite poles of an electric circuit, a flexible resistance element carried by said drum in inoperative position and having mechanical and electrical attachment to said anchor member when in operative connection whereby heat is caused to flow upwardly over said windshield by convection.

4. A windshield heater comprising spaced terminal members fixed adjacent a vehicle window and constituting the terminals of an electric circuit, an elongated extensible resistance element electrically connected at one end to one terminal member and extensible to engage electrically its opposite end with the companion terminal member, means carried by said opposite end portion of said resistance element to permit the manual extension and engagement of the resistance element to said companion terminal member, and means normally urging the retraction of the resistance element toward said one terminal member, said last means being operative upon disengagement of said opposite end from said companion terminal member.

5. A windshield heater comprising spaced terminal members fixed adjacent a vehicle window and constituting the terminals of an electric circuit, an elongated extensible resistance element electrically connected at one end to one terminal member and extensible from a housing to engage electrically its opposite end with the companion terminal member, and means carried by said opposite end portion of said resistance element to permit manual extension and engagement of the resistance element to said companion terminal member, said resistance element being adapted to be retracted into said housing.

6. A heater for windshields comprising a casing mounted adjacent said windshield, an anchor member adjacent said windshield and spaced from said casing, said anchor member being connected to a source of electrical energy, a heating member housed within and movably mounted in said casing and having one end detachably connected to said anchor member for holding the heating member extended in its operative position and for energizing the same, said heating member being retractible into said casing when in the inoperative position detached from said anchor member.

7. A heater for windshields comprising a pair of supports mounted adjacent the windshield and connectible to the opposite sides of an electrical circuit, a resistance element normally carried on one of said supports independently of the other and movable to the other of said supports, said element constituting a circuit closing switch detachable at will from the latter support.

8. A windshield heater comprising a housing, a socketed anchor member spaced from said housing, said anchor member and said housing comprising the open ends of an electrical circuit, and a resistance element carried by said housing and having a pin on its free end, said resistance element being withdrawable from said housing whereby said pin may engage said socketed anchor member to close the electrical circuit and render the heater operative.

9. A windshield heater comprising a housing having a tubular feed end, an anchor member spaced from said housing and connected to a source of electrical energy, an extensible heating member in the housing and withdrawable therefrom through the feed end to contact with said anchor member and source of electrical energy and thus provide an elongated source of heat, means for collapsing and retracting the member within the housing, and a head on said heating member having a portion telescoping the feed end and being supported by the latter when the heating member is retracted within the housing.

10. A windshield heater comprising a housing, and an anchor member relatively spaced and mounted adjacent a windshield and comprising the open ends of an electrical circuit, a resistance element carried by said housing and movable thereon to engage with said anchor member to complete the circuit, said anchor member comprising an adjustable arm and a socketed post secured thereto and insulated therefrom whereby said resistance element may be adjusted toward and from the windshield.

ERWIN C. HORTON.
HENRY HUEBER.